April 15, 1969  J. L. FISCHER ET AL  3,438,371
SELF-ADHESIVE DRESSING
Filed May 2, 1966  Sheet 2 of 2
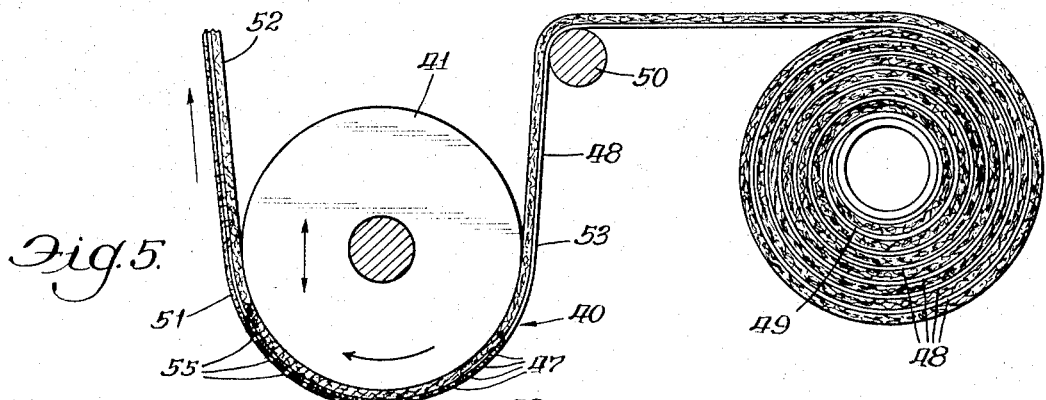
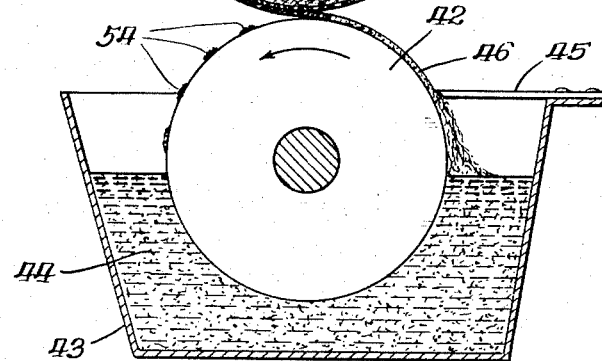
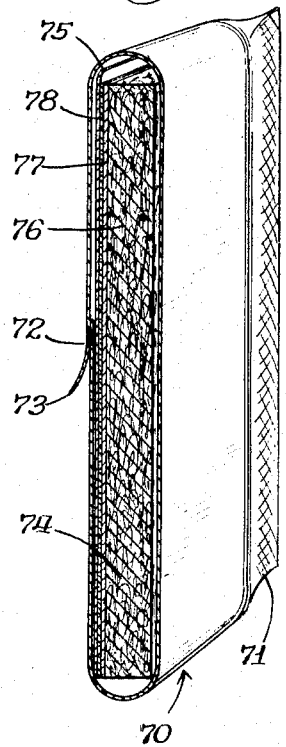
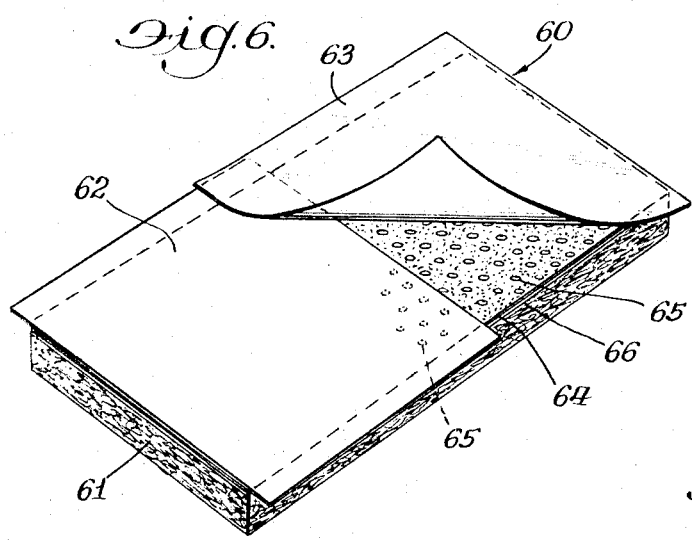
Inventors:
John L. Fischer
Robert J. Mack
By: James I. Fawcett
Atty

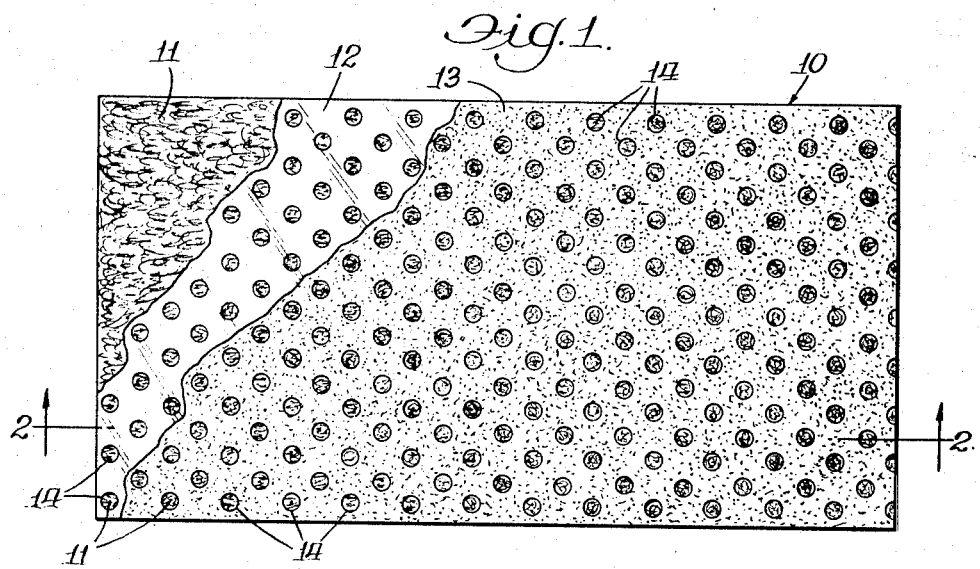
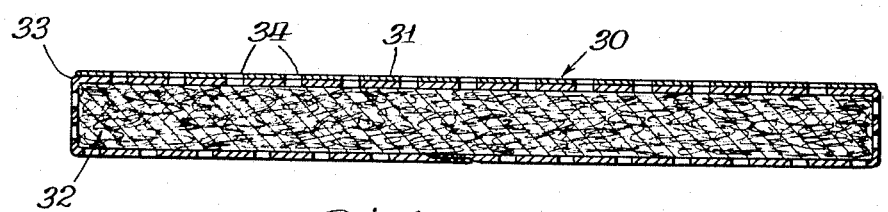

United States Patent Office 3,438,371
Patented Apr. 15, 1969

3,438,371
SELF-ADHESIVE DRESSING
John L. Fischer, Arlington Heights, and Robert J. Mack, Palatine, Ill., assignors to The Kendall Company, Boston, Mass., a corporation of Massachusetts
Filed May 2, 1966, Ser. No. 546,973
Int. Cl. A61l 15/01; A61f 5/40
U.S. Cl. 128—156                    12 Claims

ABSTRACT OF THE DISCLOSURE

A wound dressing having an absorbent layer, the wound contact surface of which is provided with pressure sensitive adhesive-coated zones and adhesive-free zones. The adhesive-coated surfaces is applied directly over the wound area but does not appreciably adhere to the wound thereby providing a wound dressing which is substantially non-adherent to the wound area but adherent to the areas immediately surrounding the wound area.

---

This invention is concerned with unitary self adherent surgical and first-aid dressings. The invention is particularly concerned with such dressings which comprise an absorbent layer at least one surface of which is intended for absorptive exposure to a wound and covered with an interrupted coating of pressure-sensitive adhesive. The adhesive portions of this surface do not adhere appreciably to the wound, but do adhere to the areas closely adjacent to the wound.

For purposes of this invention a pressure sensitive adhesive is one which at the moment of dressing application is tacky and may be adhered to skin with the application of light pressure.

An "absorbent layer" as used in this invention is defined as a layer having integrated surface areas at least discrete portions of which lie generally in the same plane forming a substantial portion of the surface on the application side, said absorbent layer being capable of taking up in excess of five times its own weight of blood, serum, or other body exudates either by capillary action or by cellular bibulosity or both.

It is the main object of this invention to provide self-adherent dressing effective in taking up body fluids, which are non-adherent to wound areas but which are adherent to areas closely adjacent and substantially following the contours of the wound.

It is a further object of the invention to provide self-adherent dressings within the main objective in which the adhesive is applied directly to the absorbent sheet.

It is a still further object of the invention to provide self-adherent dressings within the main objective wherein the adhesive is applied to an interposed sheet capable of transmitting body fluids to the absorbent layer.

Other objects of the invention will be apparent from an examination of the specification and from the drawings in which:

FIGURE 1 illustrates a plan view of a typical dressing of the invention broken away to illustrate its construction.

FIGURE 2 is a cross section of the dressing of FIGURE 1.

FIGURE 3 is a typical dressing of the invention shown in cross section in which adhesive areas are shown applied directly to an absorbent layer.

FIGURE 4 is a cross section of another typical dressing in which filling material is enclosed in a sheet material having an integrated surface constituting with the enclosed filling material an "absorbent layer."

FIGURE 5 illustrates diagrammatically apparatus useful in producing those products of the invention which include an interposed perforate sheet between the adhesive and the absorbent layer and those products in which the absorbent layer has its integrated surface embossed or perforated.

FIGURE 6 illustrates in perspective a typical dressing of the invention prior to packaging including adhesive protective facings.

FIGURE 7 illustrates in perspective and partly in section a packaged typical dressing of the invention.

Heretofore, non-adherent surgical dressings with perforated film wound contact coverings such as those shown in U.S. Patent No. 2,923,298 and U.S. Patent No. 3,012,918 have had to be adhered to the wound area by adhesive strips. Recently some of these dressings have had marginal portions of the dressing itself coated with adhesive as the dressing illustrated in FIGURES 10 and 11 of U.S. Patent No. 2,703,083. Similarly, certain first aid and finger bandages have consisted of an adhesive tape strip with a perforate-film-covered absorbent pad centrally adherent thereto whereby adhesive completely surrounds the pad portion. But in all of these prior structures there exists an adhesive free zone which is intended to be applied directly to the wound. Adhesive areas of prior dressings are intended to be applied to body areas outside the would area and either are substantially non-penetrable by wound exudates or are so non-absorbent as to be impractical for body fluid take up.

We have found, however, that usual pressure sensitive adhesives which are non-soluble in body fluids may be placed in direct contact with open wounds, ulcers, burns, abrasions, incisions, punctures, and the like without appreciable adherence to the wound area and may be removed therefrom without trauma. One of the significant advantages of the dressings of this invention is that the dressing after removal of the adhesive protective facing may be applied directly to the wound with the adhesive surface in direct contact with the wound and the surrounding area. Thus the dressing sticks to the surrounding skin areas up to the very edges of the wound but does not stick appreciably to the wound or interfere with the healing process.

Referring once more to the drawings:

In FIGURE 1, a typical dressing of the invention 10 is shown comprising an absorbent layer 11, an interposed apertured adherent sheet 12, and a superimposed adhesive area 13. Layer 11 is exposed in discrete areas 14 through the apertures in sheet 12.

FIGURE 2 is a cross sectional view of the dressing of FIGURE 1 taken along line 2—2 and viewed in the direction of the arrows. Sheet 12 may be any perforated, integrated sheet but preferably is a smooth perforated integrated sheet such as a polymeric film, a paper or a metallic foil.

FIGURE 3 is a cross sectional view of another typical embodiment 20 of the invention. The material of absorbent layer 22 may be nonwoven, woven, knitted, netted, foamed, accreted or otherwise formed into an integrated layer. The adhesive 21 contacts the absorbent layer and is shown as a sheet with apertures 23 which permit body fluids to reach the absorbent layer. But an embodiment in which isolated spots of adhesive are surrounded by paths of uncovered absorbent layer is also included in the invention.

FIGURE 4 is a cross sectional view of another typical embodiment 30 of the invention. The filling material 32 is enclosed on four sides with a sheet 33 of the type 12 described in connection with FIGURES 1 and 2. The adhesive 31 which is applied only to the portion of the surface intended for body contact has apertures 34 coinciding with the apertures in the sheet 33. Obviously, the perforated area need not extend beyond the contact area if that construction is desired. In forming the sheet 33 it is preferred to utilize either glue or heat sealing to close the sheet into a longitudinal extending sheath surrounding the filling material but other methods of forming the sheet into an enclosing sheath (which may have any desired cross section) may be used, if desired. If the filling material 32 is integrated, it is unnecessary to seal the ends but rather the longitudinally extending strip is cut into dressing lengths as desired. Where the filling material is not integrated, however, it is necessary to close the ends of the dressings to prevent escape of the nonintegrated filling material. This can be done most conveniently when the filling material is disposed in the sheath in intermittently spaced patches, by heat sealing, solvent sealing, gluing or otherwise fastening, transversely of the longitudinally extending sheathed material, between the patches. In many cases, however, if the filling material is thin or is itself heat sealable or contains fusible elements, transverse closing may be accomplished with uninterruptingly extending sheathed filling material. At any rate, while the adhesive may be applied to individual dressings, it is preferred to apply it to an elongated sheath covered absorbent layer which is later severed transversely in the area of the transverse seals.

Where the filling material of the dressing illustrated in FIGURE 4 is unintegrated and very fine as fine fibered wood pulp, the openings in the sheet 33 are of such size as to prevent escape of the filling material, but still provide a sheet which is porous with the ability to transmit body fluids to the unintegrated material. Obviously, the apparatus of FIGURE 5 could not be used except where the sheet 33 has an embossed, raised surface with depressed areas therein.

An unembossed dressing of the type illustrated in FIGURE 4 but with an unintegrated filling material in a porous but not perforate sheath may have the adhesive applied by printing processes particularly wall paper printing processes.

Obviously, where a perforate sheet is interposed between the adhesive and the absorbent layer, the adhesive may be applied by printing and other methods so that only part of each perforation is left uncovered or some of the perforations are entirely covered.

FIGURE 5 shows diagrammatically an apparatus 40 for producing the preferred dressing embodiments of the invention. A roll 49 of a lamination 53 comprising absorbent layer 52 and perforated sheet 48 (illustrated partially in section to show the perforations) moves around positioning roller 50 into absorbent layer contact with a vertically adjustable roll 41. The vertical adjustment on roll 41 is preferably precise so that the nip between roll 41 and roll 42 may be accurately adjusted and maintained. Roll 42 as it turns, partially immersed in pressure sensitive adhesive 44 contained in reservoir 43, picks up adhesive 44 which is doctored by blade 45 to give a layer of adhesive 46 adherent to roll 42. With low viscosity adhesives the layer 46 may enter the perforations 47 in the sheet 48 but should not contact the absorbent layer. That is, the nip distance for low viscosity adhesives should be greater than the sum of the thicknesses of absorbent layer 52 and adhesive layer 46. As the adhesive layer 46 is carried into the nip by roll 42, it contacts the surface of the sheet 48 adhering thereto and bridging the holes therein. As the rolls 41 and 42 continue to turn beyond the nip, the portions of adhesive 54 bridging the holes in sheet 48 remain adherent to roll 42 while the adhesive adherent to sheet 48 continues to adhere thereto so that the two portions of adhesive separate forming holes 55 in the adhesive layer 51 overlying and coincident with holes 47 in sheet 48 and leaving a very thin coating adherent to roll 42 in addition to the patches of adhesive 54.

With higher viscosity adhesives the minimum nip distance is not so critical. Actually, where the viscosity of the adhesive is as high as 50,000 centipoises, the adhesive may lightly contact the absorbent through the holes in the underlying sheet.

It is preferred, however, that the nip distance be sufficiently great as to substantially preclude any edgewise displacement of adhesive. Where products similar to FIGURE 3 are to be made, the apparatus of FIGURE 5 may be utilized only where the integrated absorbent layer has an embossed or perforated surface. The normal planar surfaced absorbent layer, however, is best converted into the embodiments of this invention shown in FIGURE 3 by imprinting as by wall paper printing techniques with very viscous adhesives with a minimum of pressure in the nip.

In FIGURE 6 a completed dressing 60 is shown with an integrated absorbent layer 61, an interposed perforate sheet 66 and a perforate adhesive layer 64. The integrated absorbent layer 61 is exposed through the holes 65. Protective sheets 62 and 63 overlap centrally, each being in reduced adherence to the adhesive for ease in removal when the dressing is to be applied.

In FIGURE 7 a packaged dressing of the invention 70 is sealed at the side edges 71 and transversely at 72 to provide peelable seals. The dressing package is opened by pulling the flap 73 outwardly and upwardly from the seal 72 and the side seals. The dressing 74 consists of an integrated absorbent layer 76, a perforate sheet 77, a perforate adhesive 78 and a facing sheet 75 which has a projecting unadhered portion for its removal. Packages such as that illustrated in FIGURE 7 may be sterilized by a number of well known processes such as steam or dry heat sterilization, chemical gas sterilization such as ethylene oxide sterilization and electron beam sterilization depending upon the particular material utilized as is well known.

The adhesives which are applied to the dressings of this invention are diluted to viscosities in the range of 2,000 to 150,000 centipoises preferably in the range of 25,000–50,000 centipoises. The preferred thickness of adhesive in the wet condition to be applied is about 1–2 mils which will yield a dried adhesive .1 to 1 mil in thickness on the dressing depending on the solids content. A range of adhesion of 3 to 5 ounces when tested against stainless steel in accordance with ASTM test No. D 1000 at 180° pulloff is preferred. If this adhesion is exceeded, the viscosity of the wet adhesive may be decreased for the same wet thickness by adding more solvent. Likewise, if the adhesion is less than 3 ounces, the wet adhesive viscosity should be increased to the point where the adhesion is in the desired range.

The invention is not limited as to type of pressure sensitive adhesive. Typical examples of suitable adhesives given below are in no way to be considered limitations.

*Example I*

| | Parts by wt. |
|---|---|
| Pale crepe rubber | 100 |
| Zinc oxide | 25 |
| Titanium dioxide | 5 |
| Calcium carbonate | 15 |
| Staybelite Ester #10 [1] (glycerol ester of hydrogenated rosin) | 30 |
| Poly-Pale Resin [1] (polymerized high melting rosin) | 30 |
| Staybelite [1] (hydrogenated wood rosin) | 20 |
| Hydrocarbon solvent (dilute to proper viscosity for application in accordance with the invention). | |

[1] Available from Hercules Powder Co., 910 Market St., Wilmington, Del.

*Example II*

| | Parts by wt. |
|---|---|
| Polyvinyl isobutyl ether | 100 |
| Glycerol ester of hydrogenated rosin | 100 |
| Zinc oxide | 100 |
| Hydrocarbon solvent (dilute to proper viscosity for application in accordance with the invention). | |

Example III

A pressure-sensitive adhesive polymer was prepared by the aqueous emulsion polymerization of monomers of N-t-$C_{12}$ maleamic acid, 2-ethylhexyl acrylate and ethyl acrylate in the mol ratio of 1:4:1, respectively (corresponding to a weight ratio of about 25.9:65.3:8.8) in accordance with conventional emulsion polymerization techniques employing a nonionic emulsifier. N-t-$C_{12}$ maleamic acid monomer is a mixture of maleamic acids prepared by amidating maleic anhydride with a complex mixture of branched alkyl amines principally having alkyl groups in the 11–22 carbon atom range and marketed by Rohm and Haas under the trademark Primene 81-R. Vacuum fractional distillation and neutral equivalents of the fractions show that Primene 81-R is composed of 90% alkyl amines averaging from 11 to 14 carbon atoms. The neutral equivalent of the mixture is 191, corresponding to an alkyl amine having an average of about 12 carbon atoms. It is reported that this mixture includes such t-alkyl amines as t-butyl amine; 1,1,3,3-tetramethylbutyl amine; 1,1,3,3,5,5-hexamethylhexyl amine; 1,1,3,3,5,5,7,7-octamethyloctyl amine; 1,1,3,3,5,5,7,7,9,9-decamethyldecyl amine; and 1,1,3,3,5,5,7,7,9,9,11,11-dodecamethyldodecyl amine. The adhesive polymer was washed and dried to remove non-adhesive polymerization residues and was diluted with toluene to a viscosity in the range of 2,000 to 150,000 centipoises for application in accordance with the invention.

It is well known how to treat various hydrophobic fibers with wetting agents so that their surfaces may be wetted sufficiently to support capillary action either when incorporated into integrated fabrics whose reticulated structure provide sufficiently small channels or whose random or ordered disposition in nonwoven fabrics provide such channels or when collected in unintegrated fibrous masses whose density is such as to provide such channels. Such hydrophobic fibers and other more easily wetted fibers when formed into structures which fall within the definition of "absorbent layer" as herein defined are suitable in the dressings of this invention.

The relationship between the absorbent layer and the interposed sheet where one is provided, should be such that wound fluids which penetrate the interposed sheet will contact the absorbent layer. The interposed sheet must be affixed to the absorbent layer so as to be normally inseparable in use.

In the case of sheathed dressings, it is necessary that the sheath contact the filling material so as to constitute an absorbent layer.

We claim:

1. A wound dressing in accordance with claim 11 wherein the adhesive areas are directly adhered to the surface of the absorbent layer.

2. A wound dressing in accordance with claim 11 wherein a sheet pervious to the passage of body fluids is interposed between said pressure sensitive adhesive areas and said absorbent layer.

3. A wound dressing in accordance with claim 2 wherein the sheet is provided with a plurality of apertures through which portions of the absorbent layer are exposed to the wound area.

4. A wound dressing in accordance with claim 2 wherein the sheet comprises a polymeric film.

5. A wound dressing in accordance with claim 11 wherein the absorbent layer comprises a non-woven structure.

6. A wound dressing in accordance with claim 11 wherein the absorbent layer comprises non-integrated cellulosic fibers.

7. A wound dressing in accordance with claim 11 wherein the absorbent layer comprises an integrated fabric.

8. A wound dressing in accordance with claim 11 wherein the pressure sensitive adhesive is an acrylate containing polymeric pressure sensitive adhesive.

9. A wound dressing in accordance with claim 11 wherein the pressure sensitive adhesive is a rubber base pressure sensitive adhesive.

10. A wound dressing in accordance with claim 11 wherein the pressure sensitive adhesive is a polymeric vinyl ether containing pressure sensitive adhesive.

11. A unitary self-adherent wound dressing comprising an absorbent layer having a wound contact surface, said surface having discrete pressure sensitive adhesive-coated zones and discrete adhesive-free zones, said zones having a configuration such that no circle having a diameter greater than ¼ inch may be inscribed in any adhesive-free zone, whereby pressure sensitive adhesive constitutes a substantial portion of the wound contact surface but due to the configuration of the adhesive-coated and adhesive-free zones, the wound contact surface is substantially non-adherent to the wound area.

12. A wound dressing in accordance with claim 2 wherein said sheet envelopes the total surface area of said absorbent layer.

References Cited

UNITED STATES PATENTS

| 2,877,765 | 3/1959 | Bunyan | 128—156 |
|---|---|---|---|
| 2,923,298 | 2/1960 | Dockstader et al. | 128—296 |
| 2,988,461 | 6/1961 | Eichel | 117—155 |
| 3,085,572 | 4/1963 | Blackford | 117—122 |
| 3,156,242 | 11/1964 | Crowe | 128—296 |
| 3,292,619 | 12/1966 | Egler | 128—156 |
| 3,364,063 | 1/1968 | Satas | 117—122 |

ADELE M. EAGER, *Primary Examiner.*

U.S. Cl. X.R.

128—160, 169